United States Patent [19]
Biswas et al.

[11] Patent Number: 5,805,905
[45] Date of Patent: Sep. 8, 1998

[54] METHOD AND APPARATUS FOR ARBITRATING REQUESTS AT TWO OR MORE LEVELS OF PRIORITY USING A SINGLE REQUEST LINE

[75] Inventors: Sukalpa Biswas, Sunnyvale; Dipankar Bhattacharya, Santa Clara; Mark Williams, San Jose, all of Calif.

[73] Assignee: OPTi Inc., Milpitas, Calif.

[21] Appl. No.: 524,224

[22] Filed: Sep. 6, 1995

[51] Int. Cl.[6] ................................................. G06F 13/14
[52] U.S. Cl. .................. 395/732; 395/729; 395/861; 395/477; 395/478
[58] Field of Search .................... 395/287–305, 395/728–732, 856–871, 474–480

[56] References Cited

U.S. PATENT DOCUMENTS

| | | | |
|---|---|---|---|
| 4,641,266 | 2/1987 | Walsh | 395/291 |
| 5,146,596 | 9/1992 | Whittaker et al. | 395/296 |
| 5,276,887 | 1/1994 | Haynie | 395/294 |
| 5,398,244 | 3/1995 | Mathews et al. | 370/85.6 |
| 5,440,698 | 8/1995 | Sindhu et al. | 395/200.08 |
| 5,448,742 | 9/1995 | Bhattacharya | 395/481 |
| 5,560,016 | 9/1996 | Fiebrich et al. | 395/728 |
| 5,572,655 | 11/1996 | Tuljapurkar et al. | 395/788 |

FOREIGN PATENT DOCUMENTS 0 279 662 A2  8/1988  European Pat. Off. ......... G09G 1/16

OTHER PUBLICATIONS

PCI Special Interest Group, "PCI Local Bus Specification", Revision 2.0 (Apr. 30, 1993).

*Primary Examiner*—Jack B. Harvey
*Assistant Examiner*—Sumati Lefkowitz
*Attorney, Agent, or Firm*—Fliesler, Dubb, Meyer & Lovejoy

[57] ABSTRACT

Method and apparatus for arbitrating for a shared resource among two or more devices, wherein one device can arbitrate at two or more different levels of priority at different times. Only two conductors are used to communicate between the device and the arbiter: one request signal line and one grant signal line. In order to assert a request for control of memory, the device brings the request signal line to a predefined logic level. The arbiter considers this a low priority request for control of the shared resource, and the arbitration proceeds accordingly. Then, if the device's request is a high priority request, or if it was originally a low priority request and has now become a high priority request, the device brings the request signal to the opposite logic level to thereby increase the priority level of its request. In either case, the arbiter grants control of the shared resource by asserting the device grant signal to the device. Only two wires are required for the dual priority device to participate in the arbitration.

69 Claims, 8 Drawing Sheets

METHOD AND APPARATUS FOR ARBITRATING REQUESTS AT TWO OR MORE LEVELS OF PRIORITY USING A SINGLE REQUEST LINE

BACKGROUND

1. Field of the Invention

The invention relates to arbitration protocols for shared resources, and more specifically to a protocol for arbitrating access to a memory space that is shared by at least a host processor and a video controller.

2. Description of Related Art

In a typical IBM PC/AT-compatible computer system, a host processor such as an Intel Pentium processor is coupled to a host bus and, via a host memory controller, to main memory. The host bus is also coupled via an I/O bridge to an I/O bus, such as an ISA (Industry Standard Architecture) bus. Various peripheral devices are connected to the ISA bus, including a video controller.

The video controller is coupled to the display, and also to its own bank of display memory, also called video memory. The display memory is typically on the order of one megabyte, although the standard PC/AT architecture allocates only 128 k bytes (at addresses A0000-BFFFF). Therefore, in order to access (read or write) the full one megabyte of display memory, the host processor first must program a register in the video controller to indicate which 128 k-byte segment of display memory is to appear through the 128 k-byte window allocated by the system architecture. When the host processor actually performs the access, the I/O bridge recognizes that the access is to an address within the 128 k-byte window, and translates the access onto the ISA bus. The video controller recognizes the address, and translates it into the currently selected 128 k-byte segment of the display memory. Only then is the access finally made to the display memory.

Various improvements have been made to the standard architecture in order to speed up accesses to video memory. One such improvement is known as the VESA (Video Electronics Standards Association) local bus or VL-Bus standard, and is defined in VESA, "VESA VL-Bus Local Bus Standard", Revision 1.0 (1992), incorporated herein by reference. In systems which use this standard, the control, address and data leads of the host bus are monitored by the video controller. When the video controller recognizes an access to the 128 k-byte video memory address window, it asserts a "local device" signal to the I/O bridge and responds directly to the cycle on the host bus. Although access to the video controller in the I/O address space continue to take place via the I/O bridge and the ISA bus, accesses to memory bypass the bridge and avoid its inherent delays.

In another such improvement, the video controller is connected to a "mezzanine" bus, such as a PCI (Peripheral Components Interconnect) bus, rather than the ISA bus. The PCI-bus standard is defined in Intel Corp., "Peripheral Component Interconnect (PCI), revision 1.0 Specification" (Jun. 22, 1992), in PCI Special Interest Group, "PCI Local Bus Specification", Revision 2.0 (Apr. 30, 1993), and in PCI Special Interest Group, "PCI Local Bus Specification", Rev. 2.1 (Jun. 1, 1995), all incorporated herein by reference. Like the ISA bus, a PCI bus is coupled to the host bus via an I/O bridge. Unlike the ISA bus, however, the PCI bus is extremely fast. All accesses to the video controller, both in its I/O address space and in its memory address space, take place via the PCI bus.

In a yet another improvement, yet another architecture has been proposed. In this architecture, known as a "unified memory" architecture, display memory is mapped to a region of the same physical DRAM chips which contain the host memory. For example, in a 16-megabyte system, the first 14 megabytes might be allocated for the host memory address space, and the high order two megabytes might be allocated for the display memory address space. 16 megabytes of physical memory can be provided, with a full 64-bit data path, using two banks of 16 parallel 4-megabit DRAMs each (each DRAM organized as one megabit by 4 bit).

In a unified memory architecture, because the memory is now a shared resource, an arbitration protocol is required to arbitrate access to the memory between the host and the video controller. One example of a conventional arbitration protocol is that used on the PCI bus for arbitrating for control of the PCI-bus among multiple PCI agents. In this protocol, described at pp. 37–46 of the above-incorporated PCI 2.0 specification and also in the PCI 2.1 specification, a central arbitration scheme is used, in which each agent has a unique request (req#) and grant (gnt#) signal lines connected to the central arbiter. When an agent desires control of the bus, it asserts its req# signal. The central arbiter samples the agent's req# signal asserted and, when it is time to grant control of the bus to that agent, asserts the agent's gnt# signal. An asserted gnt# signal shifts control of the PCI-bus to the particular agent for a single transaction. If an agent desires another access, it continues to assert its req# signal. If an agent deasserts its req#, the arbiter can deassert the agent's gnt# signal and shift control of the bus to another agent. The central withdraw control of the bus from an agent at any time by negating the agent's gnt# signal.

A video controller typically accesses display memory for two purposes: processing of graphics commands received by the video controller via its address ports in the I/O address space, and for refreshing the display from the frame buffer. Accesses for the former purpose can be read or write accesses, whereas accesses for the latter purpose are read only. The reading of frame buffer data to refresh the display is performed via a first-in-first-out (FIFO) buffer/shift register, and therefore can tolerate some latency in its access to DRAM if the FIFO is still mostly full. However, if the FIFO is nearly empty, then a low latency access to the frame buffer is essential. Therefore, it has been proposed that in a unified memory architecture, the video controller arbitrate with the host for access to the common memory using two priority levels: the video controller would issue a low priority request when the FIFO level falls to a "high water mark", and if the FIFO level falls to a "low water mark" before the request has been granted, then the video controller would issue a high priority request for access to the DRAM.

While this proposal has merit, a problem arises because the host memory controller and the video controller are typically located in different chips. If it is desired to implement arbitration using a simple request and grant handshake mechanism as used on the PCI-bus, then a two-level priority arbitration scheme would require at least three signal lines (two "request" signal lines and a "grant" signal line) to pass between the two chips. But pin count is often at a premium in these chips, making the need for three signal lines a very expensive proposition.

SUMMARY OF THE INVENTION

Accordingly, it is an object of the invention to provide a method and apparatus for arbitrating for a shared resource among two or more devices, wherein one device can arbitrate at two or more different levels of priority at different times, while minimizing the number of electrical conductors required for such device to participate in the arbitration.

According to the invention, roughly described, only two conductors are used to communicate between the device and the arbiter: one request signal line and one grant signal line. In order to assert a request for control of memory, regardless of the urgency with which the device requires access, the device begins by bringing the request signal line to a predefined logic level (e.g., low). The arbiter considers this a low priority request for control of the shared resource, and the arbitration proceeds accordingly. Then, if the device's request is a high priority request (or if it was originally a low priority request and has now become a high priority request), the device issues another predefined, recognizable event on the same request signal line to thereby increase the priority level of its request. In one embodiment, the predefined event is the leading edge of a high-going pulse. The arbiter then continues the arbitration, now considering the device's request to be a high priority request. In either case, the arbiter grants control of the shared resource by asserting the device grant signal to the device. Thus only two wires are required for the dual priority device to participate in the arbitration.

It can be seen that the above arbitration protocol can be extended to support three or more priority levels for a given device, merely by defining each pulse on the request signal line as representing an incremental increase in the desired priority level. Alternatively, in some embodiments, a device's priority level in the arbitration can start out at the highest level, each pulse of the request signal line indicating an incremental reduction in the priority level. In the case of devices which will use the resource to fill a FIFO, an incrementally increasing priority level is preferred since access requests will typically begin at a low priority and only later, as the FIFO empties, move up to a higher priority level.

The above arbitration protocol can also be extended to handle more than two devices desiring control over the same shared resource.

BRIEF DESCRIPTION OF THE DRAWINGS

The invention will be described with respect to particular embodiments thereof, and reference will be made to the drawings, in which.

DETAILED DESCRIPTION

I. OVERALL ARBITRATION PROTOCOL

A. System Architecture for a Generalized Implementation

Figure 9:
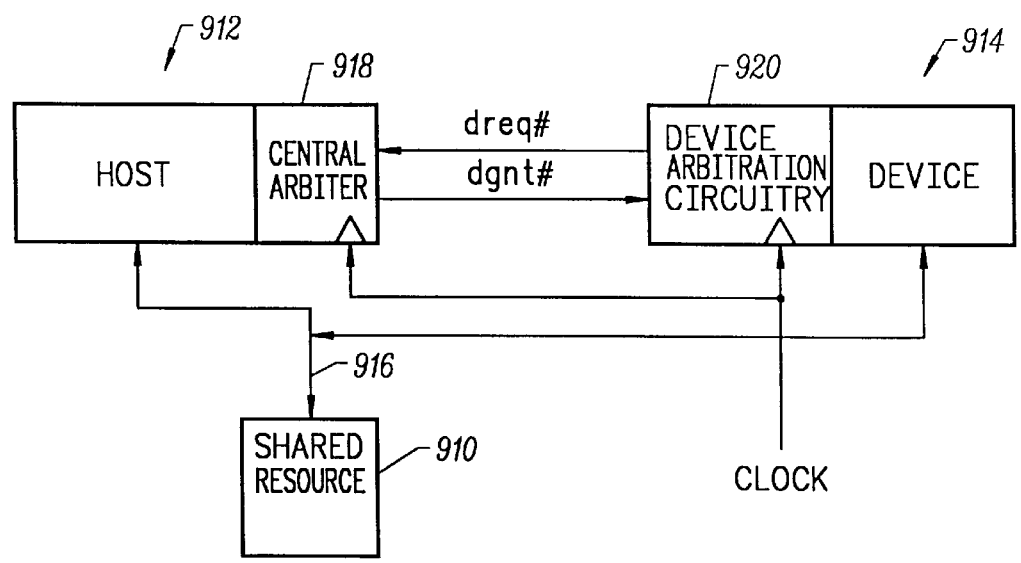

FIG. 9 is an overall block diagram of a generalized computer system incorporating the invention. It comprises a shared resource 910, a host 912, and a device 914, which also shares ownership of the shared resource 910. The host 912 is coupled to the shared resource 910 via an access bus 916, which includes address, data and/or control signals. The device 914 is also connected to the bus 916. Depending on the arbitration, only one of the two devices 912 and 914 can control the bus 916 at a time; when a device does not have control of the shared resource 910, that device must not drive any shared signal lines on the bus 916.

The host 912 includes a central arbiter 918 for control of the shared resource 910. It receives a dreq# signal from device 914 when the device 914 desires control of the shared resource 910, and asserts a dgnt# signal back to device 914 when device 914 is to be granted control of the shared resource 910. The device 914 includes device arbitration circuitry 920 to arbitrate on behalf of the device 914. The device 914 and the host 912 both assert and sample the signals dreq# and dgnt# synchronously with a common clock signal CLOCK. Other devices similar to 914 can also share control of the shared resource 910, each such additional device having its own separate dreq# and dgnt# handshake signals with the central arbiter 918.

B. Overall Arbitration State Diagram

Figure 3:
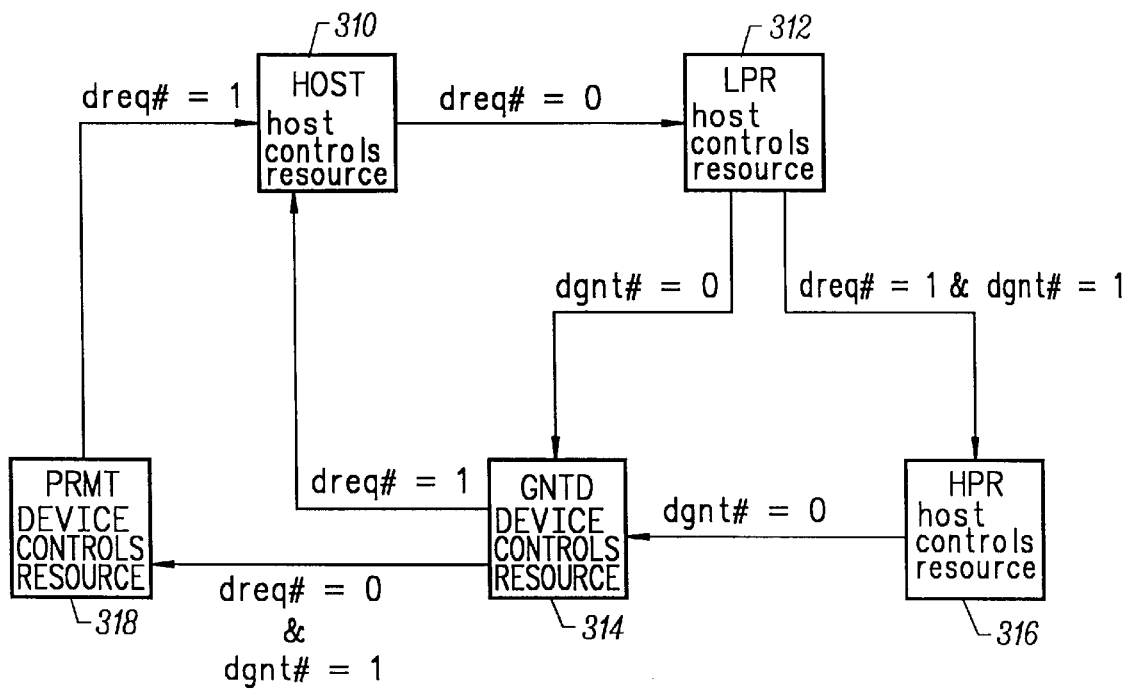
FIGS. 3–5 are state diagrams defining the operation of the arbitration protocol used in FIG. 2.

FIG. 3 is a state diagram illustrating the various states and state transitions defining the inter-operation of the central arbiter 918 and the device arbitration circuitry 920. In the state diagram of FIG. 3, as well as in the other state diagrams set forth herein, only the conditions which cause a transition from one state to another have been marked. All other conditions will keep the state machine in its then-current state. For each of the state diagrams set forth herein, implementation in circuitry (using, for example, flip-flops or other synchronous circuits) or software, is entirely conventional. Additionally, note that while state diagrams are a convenient way to represent the output sequences which are to be generated by a circuit in response to predefined input signal sequences, it will be understood that a different embodiment need not use the same states or state transitions as described herein for implementing the circuit. It is the sequence of output signals generated by the circuit in response to an input signal sequence which is important, not what internal states are defined and implemented for causing such sequences of output signals to take place.

The default owner of the shared resource 910 is the host 912. Ownership is transferred to the device 914 in response to a request therefor, and the device 914 returns ownership to the host 912 at the end of its activities, or in response to preemption by the host 912. Accordingly, the initial state of the state machine of FIG. 3 is HOST state 310. In this state, the shared resource 910 is controlled by the host 912 and no request is pending from the device 914. When the device arbitration circuit 920 brings dreq# low, the machine transitions to an LPR state 312. In state LPR, the resource continues to be controlled by the host 912, but a low priority request is now pending from the device 914. As long as dreq# remains low, the state machine remains in state LPR until the central arbiter 918 asserts dgnt#. At that time, the state machine transitions to a GNTD state 314, in which the device 914 now has control of the shared resource 910.

If, while in the LPR state 312, the device arbitration circuitry 920 brings dreq# high while dgnt# remains deasserted, the machine transitions from LPR state 312 to an HPR state 316. In HPR state 316, the host still retains control of the memory, but the request that was pending in LPR state 312 has now become a high priority request pending. As in LPR state 312, when the central arbiter 918 asserts dgnt#, the state machine transitions to the GNTD state 314, shifting control of the shared resource 910 to the device 914.

While in HPR state 316, in the present embodiment, further transitions in dreq# from the device arbitration circuitry 920 have no effect. However, for reasons which will become apparent below, the device arbitration circuitry 920 should return dreq# low in the immediately subsequent clock cycle. Therefore, it can be seen that the transition from LPR state 312 to HPR state 316 actually takes place in response to the leading edge of a high-going, one clock cycle-wide pulse in dreq#. Also, it will be appreciated that in another embodiment, additional edge transitions, or additional pulses, in dreq# while in HPR state 316, can move the arbitration state machine to yet another state; for example, the state machine might support many priority levels instead of only two, and each high-going, one clock cycle-wide pulse in dreq# increments the priority of the device 914's request by one level of urgency.

While in GNTD state 314, the device 914 retains control of the resource 910 for as long as it maintains dreq# low. The device 914 releases resource 910 by bringing dreq# high, causing a transition back to HOST state 310. While in GNTD state 314, if the host desires access to the shared resource 910, the central arbiter 918 may assert a preemption request by negating the dgnt# signal. If dgnt# is deasserted while dreq# from the device 914 remains low, the arbitration machine of FIG. 3 transitions to PRMT preemption state 318. In this state, the device 914 retains control of the resource 910 until, as with GNTD state 314, the device 914 brings its dreq# signal high. At that time, the machine transitions to HOST state 310 and control returns the memory to HOST 110. Note that when the device 914 brings dreq# high in order to transition back to HOST state 310, whether starting from GNTD state 314 or from PRMT state 318, the device arbitration circuitry 920 should keep dreq# high for at least two clocks of recovery time before lowering it again to assert another request. Keeping dreq# high for at least two clocks between requests is advantageous because it permits a third party observer of the arbitration signals to distinguish it more easily from the one-clock-cycle-wide priority incrementing pulse.

The conditions under which the device 914 makes a request for control of the shared resource 910 are not important for an understanding of the broadest aspects of the present invention. In an embodiment in which the device 914 is a video controller having a graphics engine and a FIFO for buffering pixel data for display, and the shared resource 910 is a memory, such a request can be made whenever either the graphics engine requires access to the memory or the FIFO empties to a predefined high water mark, such as ¾ full. Similarly, the conditions under which the device 914 increases the level of its request to a high priority request, are also unimportant for an understanding of the broadest aspects of the invention. Again, however, in an embodiment in which the device 914 is a video controller having a FIFO for buffering pixel data to a display, the device 914 may do so when the FIFO empties to a predefined low water mark level, such as ¼ full.

It is also unimportant for an understanding of the broader aspects of the invention to define under what conditions the host 912 releases control of the resource 910 in response to a request from the device 914 (either low priority or high priority). In one embodiment, where the host 912 is a host memory controller (HMC) for a host CPU, and the shared resource 910 is a memory, the host memory controller releases control of the memory in response to a low priority request only when current memory access cycles then taking place (if any) on the host bus can be handled from the cache. Alternatively, the host memory controller can delay release until no memory access cycles have taken place on the host bus for some predetermined number of clock cycles. There is no maximum latency specified for a low priority request to be granted. The host memory controller releases control of the memory to the device 914 in response to a high priority request, immediately after any memory access cycle from the host bus then taking place, completes. Alternatively, the host memory controller can break any ongoing memory access cycle then taking place in order to release the memory immediately in response to a high-priority request. The maximum latency from assertion of a high priority request to grant of such a request is on the order of 35 host bus clock cycles.

Also unimportant for an understanding of the broadest aspects of the invention are the conditions under which the device 914 will relinquish control of the shared resource 910 in response to a preemption request (PRMT state 318) from the host 912. However, the maximum latency for such relinquishment should not be more than about 50 host bus clock cycles.

II. IMPLEMENTATION OF ARBITRATION PROTOCOL FOR VIDEO CONTROLLER

An implementation will now be described in which the device 914 includes a video controller, the host 912 includes a host CPU and a host memory controller, and the shared resource 910 is a unified memory. The architecture illustrated is only one of many possible architectures which can implement the invention.

A. Hardware Architecture

Figure 1:
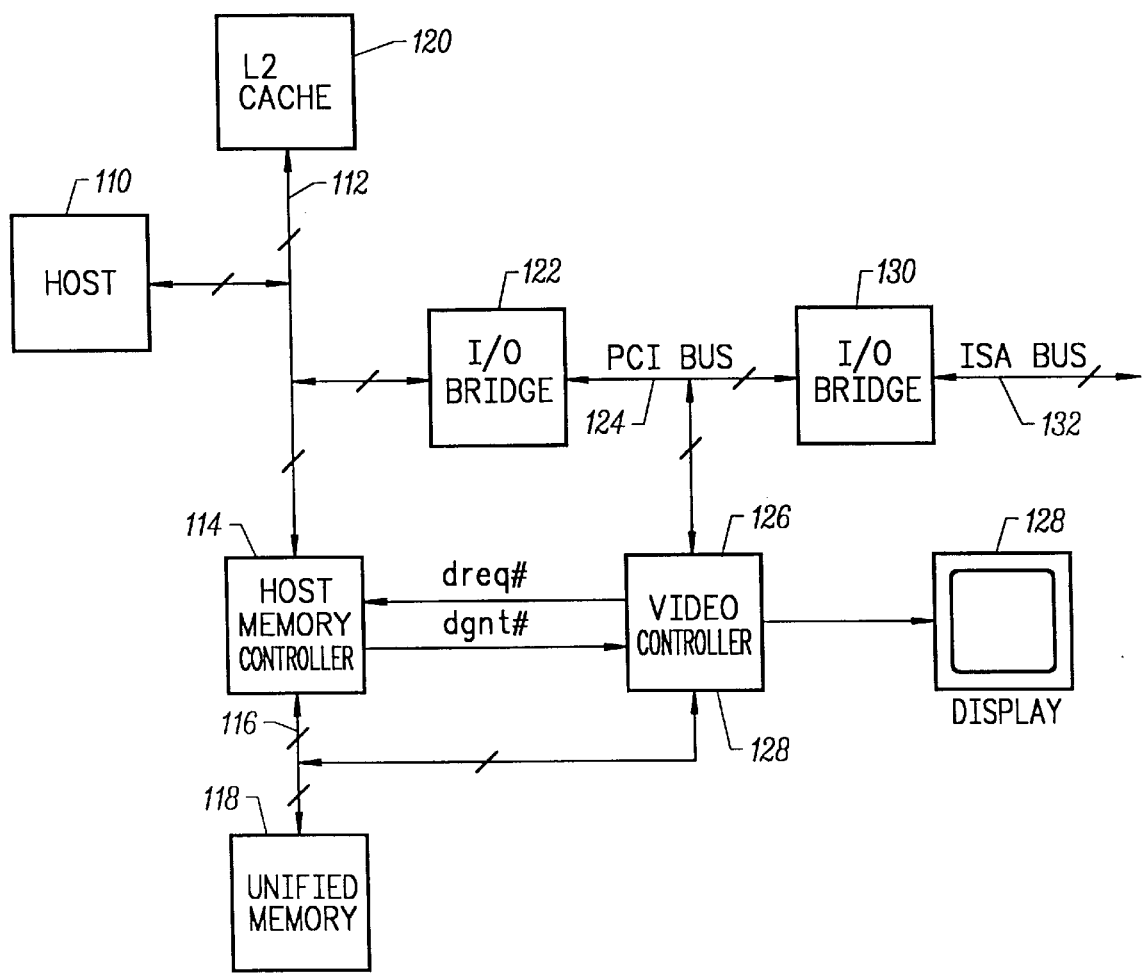
FIGS. 1 and 9 are overall block diagrams of computer systems incorporating the invention.

FIG. 1 is an overall block diagram of a computer system incorporating the invention. It comprises a host 110, which may be a Pentium processor manufactured by Intel Corporation, Santa Clara, Calif.

The host 110 is connected to a host bus 112, which includes control lines, address lines, and 64 bits of data lines (not shown individually in FIG. 1). The host bus 112 is connected via a host memory controller (HMC) 114 to a host memory bus 116, which also includes address, data and control lines (not shown individually in FIG. 1). The memory bus is connected further to the unified memory 118, which, for example, is made up of two banks of 16 parallel 4-megabit DRAMs, for a total memory capacity of 16 megabytes, and a total data path width of 64 bits. The DRAM can be standard DRAM, fast-page DRAM, EDO DRAM, burst EDO DRAM, or some other type of memory.

The host bus 112 is also connected to a level 2 (L2) cache memory 120, which for the purposes of the present embodiment, can equivalently be considered part of the Host. The host bus 112 communicates further via an I/O bridge 122 to a PCI bus 124. The PCI bus 124 conforms to the above-incorporated PCI-bus 2.1 specification. Several different devices are connected to the PCI bus 124, one of which is a video controller 126. The video controller 126 drives a display 128. The video controller 126 is also connected to a video memory bus 128, but instead of being connected to separate video memory as in conventional systems, the video memory bus 128 is coupled instead to the host memory bus 116. Only two arbitration signal lines are connected between the video controller 126 and the host memory controller 114 in order to permit arbitration for control of the shared unified memory 118: a device request (dreq#) signal line from the video controller 126 to the host memory controller 114, and a device grant (dgnt#) signal line from the host memory controller 114 to the video controller 126.

For completeness, the system of FIG. 1 also shows a further I/O bridge 130 coupling the PCI bus 124 to a standard ISA bus 132.

Figure 2:
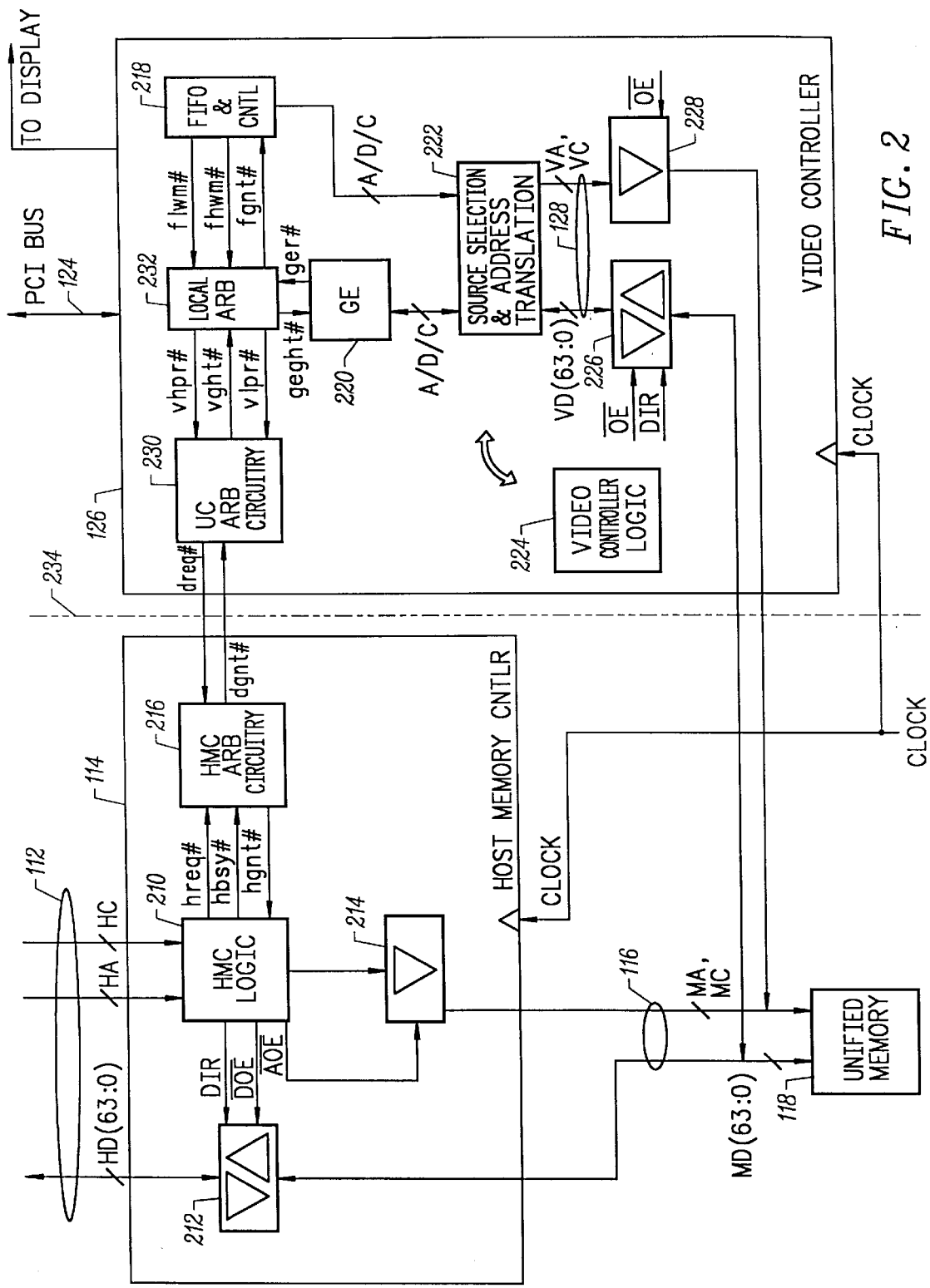
FIG. 2 is a symbolic block diagram illustrating details of the host memory controller and video controller in FIG. 1.

Note that all of the following arbitration-related signals in FIGS. 2 and 9 are defined as being asserted low in the present embodiment: dgnt#, hreq#, hbsy#, hgnt#, vlpr#, vhpr#, vgnt#, flwm#, fhwm#, fgnt#, ger#, and gegnt#. It will be understood that in a different embodiment, some or all of the arbitration-related signals could be defined as being asserted high. The terms "high" and "low" as used herein refer to logic levels 1 and 0, respectively. Also, for the purposes of the present description, it will be useful to avoid defining the signal dreq# of the present embodiment as being in its asserted or deasserted state, but rather refer to the signal explicitly as being high or being low. However, it will be understood that in a different embodiment, dreq# can be defined as having the opposite polarity.

FIG. 2 is a symbolic block diagram illustrating details of the host memory controller 114 and video controller 126 (FIG. 1). The host memory controller 114 includes, among other things not shown, HMC logic 210 coupled to receive the address and control signals from the host bus 112. The 64 host data bits from the host bus 112, HD(63:0), are connected to one side of a bi-directional buffer 212 in the host memory controller, the other side of which is connected to the 64-bit memory data bus MD(63:0). HMC logic 210 controls the direction of buffer 212 with a DIR signal, and controls the output enable with a $\overline{DOE}$ signal. HMC logic 210 outputs address and control signals for the unified memory 118, via another three-state buffer 214. HMC logic 210 enables buffer 214 with an $\overline{AOE}$ signal. The outputs of buffer 214 are connected to the memory address and memory control leads of the unified memory 118.

The host memory controller 114 also includes HMC arbitration circuitry 216. HMC logic 210 drives two signals, hreq# and hbsy#, to HMC arbitration circuitry 216 to indicate the status of the host memory controller's utilization of the unified memory 118. When host memory controller 114 does not have control of the unified memory 114, the HMC logic 210 asserts hreq# to request control. When it does have control of the unified memory 114, the HMC logic 210 asserts hreq# to indicate a desire to keep control. The signal hbsy#, which has meaning only while the host memory controller 114 has control of the bus, is asserted by HMC logic 210 to indicate that a bus cycle is actually taking place ("bus cycle indication"). HMC logic 210 is required to deassert hbsy# for a minimum of one clock cycle at the end of each bus cycle. When the host memory controller 114 is to be granted control of the unified memory 118, HMC arbitration circuitry 216 asserts a host grant (hgnt#) signal to HMC logic 210.

The video controller 126 includes, among other things, two primary elements: a FIFO 218 (including its control circuitry), and a graphics engine (GE) 220. The graphics engine 220 reads from and writes to the display memory portion of unified memory 118 as necessary to follow various graphics commands received over the PCI bus 124, and the FIFO 218 reads data from the frame buffer portion of the unified memory 118 for output to the display 128 (FIG. 1).

The graphics engine 220 and the FIFO 218 communicate with a source selection and address translation unit 222, which selects between the two sources of address and control information based on a local arbitration which takes place in a local arbiter 232 in video controller logic 224. Source selection and address translation unit 222 also performs all necessary address modification from the video memory address space to the physical address space of the video memory in the unified memory 118. This translation can be programmed into the video controller 126 via I/O port addresses on the PCI bus 124.

Source selection and translation unit 222 is connected to the video data bus VD(63:0), which is coupled, via a bi-directional three-state buffer 226, to the memory data bus MD(63:0). Similarly, the source selection and address translation unit 222 is also connected to the address and control lines of the video memory bus 128, which communicates via a three-state buffer 228 with the memory address and control leads of the unified memory 118. The output enables of buffers 226 and 228, and the direction of bi-directional buffer 226, are controlled the video controller logic 224.

The video controller 126 also includes video controller (VC) arbitration circuitry 230, which receives a video high priority request (vhpr#) signal and a video low priority request (vlpr#) signal from local arbiter 232. When the video controller 126 is granted control of the unified memory 118, the VC arbitration circuitry 230 asserts a video grant (vgnt#) signal to the local arbiter 232.

The local arbiter 232 arbitrates between requests for access to the unified memory 118 from the FIFO 218 and the graphics engine 220. It receives a FIFO high water mark (fhwm#) signal and a FIFO low water mark (flwm#) signal from the FIFO 218, and a graphics engine request (ger#) signal from the graphics engine 220. When the video controller 126 is granted control of the unified memory 118, the local arbiter 232 asserts either a FIFO grant (fgnt#) signal to the FIFO 218, or a is graphics engine grant (gegnt#) signal to the graphics engine 220. The specific arbitration algorithm used by the local arbiter 232 is unimportant for an understanding of the invention, except to note that both the FIFO high water mark signal and the graphics engine request signal result in a video low priority request (vlpr#) to the VC arbitration circuitry 230, whereas a FIFO low water mark signal results in a video high priority request (vhpr#) to the VC arbitration circuitry 230. Also note that in another embodiment, the arbitration that takes place in local arbiter 232 can cover other devices as well. For example, in addition to a FIFO and a graphics engine, such arbitration can also cover a device which performs memory accesses for the host 110 but for which neither the host 110 nor HMC 114 know how to map to appropriate video memory addresses.

The HMC arbitration circuitry 216 and the VC arbitration circuitry 230 communicate with each other via only two arbitration-related signal lines, dreq# and dgnt#. Specifically, when the video controller 126 desires control of the unified memory 118, in response to sampling either vhpr# or vlpr# asserted, VC arbitration circuitry 230 drives dreq# low to the HMC arbitration circuitry 216. When HMC arbitration circuitry 216 desires to grant control of the unified memory 118 to the video controller 126, HMC arbitration circuitry 216 asserts dgnt# to the VC arbitration circuitry 230. Both signals dreq# and dgnt# are updated and sampled synchronously with a common clock signal CLOCK. Host memory controller 114 and video controller 126 are located on separate integrated circuit chips, and dreq# and dgnt# are the only two signal lines which cross the boundary 234 between these two chips for implementing the arbitration protocol described herein.

The control signals of the memory bus 116 include an active low write enable signal (DWE#), an active low column address strobe for each of the eight byte lanes in the memory 118 (CAS#(7:0)), and an active low row address strobe (RAS#) for each of the two memory banks. Only one of the RAS# signals is shared between the host memory controller 114 and the video controller 126.

The address leads MA(11.0) of the memory bus 116 carry a multiplexed row/column address as set forth in Table I:

TABLE I

| | MA10 | MA9 | MA8 | MA7 | MA6 | MA5 | MA4 | MA3 | MA2 | MA1 | MA0 |
|---|---|---|---|---|---|---|---|---|---|---|---|
| For Symmetric DRAMs and Asymmetric DRAMS x9 and x10 | | | | | | | | | | | |
| Col | — | 1 | A11 | A10 | A9 | A8 | A7 | A6 | A5 | A4 | A3 |
| Row | — | A21 | A20 | A19 | A18 | A17 | A16 | A15 | A14 | A13 | A12 |
| For Asymmetric DRAMs x8 | | | | | | | | | | | |
| Col | — | — | — | A10 | A9 | A8 | A7 | A6 | A5 | A4 | A3 |
| Row | A21 | A11 | A20 | A19 | A18 | A17 | A16 | A15 | A14 | A13 | A12 |

MA(11) is not connected to the video controller 126. MA(10:9) may be connected as indicated in Table I. When the video controller 126 has control of the unified memory 118, it remains the responsibility of the host memory controller 114 to drive MA(11:9) high for one clock cycle and then tri-state the output drivers. MA(11:9) have pull-up resistors (not shown) to keep them high when they are not being driven.

In a given embodiment, the RAS#, DWE# and MA(8:0) signals can be externally buffered depending on the system requirements. If they are, then the buffer delay should be taken into account in the design of the DRAM interface in the video controller 126. Also, the outputs pins which drive these signal lines can be made programmable for low drive strength when an external buffer is present, and high drive strength when no external buffer is present. Note that CAS#(7:0) are not buffered externally because of the typically tight timing requirements for these signals.

Whenever the host memory controller 114 controls the memory 118, the host memory controller 114 drives all of the shared signals to the unified memory 118. When the HMC arbitration circuitry 216 asserts dgnt# to relinquish the memory to the video controller 126, the HMC 114 at the same clock edge transitions all shared signals to a high impedance state. However, the host memory controller 114 will ensure that MA(11:9), CAS#(7:0) and DWE# are all driven high for a minimum of one clock cycle, and RAS# is driven high for a minimum of two clock cycles, before this occurs.

The video controller 126 begins driving all of the shared signals immediately after the clock edge in which it samples dgnt# asserted in response to the video controller's request. Accordingly, one clock cycle of switchover time from the host memory controller 114 to the video controller 126 is guaranteed. Thereafter, the video controller 126 drives all of the shared signals as long as it continues to maintain dreq# low. When the video controller 126 releases the memory by bring dreq# high, the video controller 126 drives all of the shared signals to the high impedance state at the same clock edge. However, before doing so, the video controller 126 will ensure that RAS#, CAS#(7:0) and DWE# are driven high for a minimum of one clock cycle before driving them to the high impedance state. The host memory controller 114 begins driving the shared signals immediately after the clock edge at which its samples dreq# high, thereby guaranteeing one clock cycle of switchover time from the video controller 126 to the host memory controller 114.

It will be appreciated that the earliest that the video controller can drive RAS# low to start a memory access cycle is two clocks after dgnt# is asserted to release the memory to the video controller. Therefore, by requiring that the host memory controller 114 drive RAS# high for a minimum of two clock cycles before asserting dgnt# and three-stating the shared signal lines, a four-clock-cycle-RAS#-precharge time is guaranteed without the video controller 126 having to take any additional steps to ensure such a precharge time. Moreover, if the host memory controller 118 had not been accessing the shared bank of memory 118 immediately before releasing control of the memory to the video controller 126, the host memory controller 114 does not need to delay for any RAS# precharge time before doing so because RAS# has already been driven high for a while. This scheme therefore saves a few clock cycles of latency in the arbitration.

Similarly, after the video controller 126 brings dreq# high to release control of the memory to the host memory controller 114, the host memory controller 114 requires a minimum of three clock cycles before it can drive RAS# to start a host-originated memory access cycle to the same bank of memory that was accessed by video controller 126. Therefore, by requiring that the video controller drive RAS# high for a minimum of one clock cycle before bringing dreq# high to return control of the memory 118 to the host memory controller 114, a minimum of four clock cycles of RAS#-precharge time is guaranteed even if the immediately subsequent memory access by the host memory controller 114 is to the same shared bank of memory which had been accessed just previously by the video controller 126. The asymmetry between the pre-release RAS# precharge times (two clock cycles required for HMC 114 but only one clock cycle required for video controller 126) is advantageous because in a typical embodiment, the HMC 114 has multiple memory banks to access whereas the video controller 126 accesses only one memory bank.

B. Video Controller Arbitration Circuitry State Machine

Figure 4:
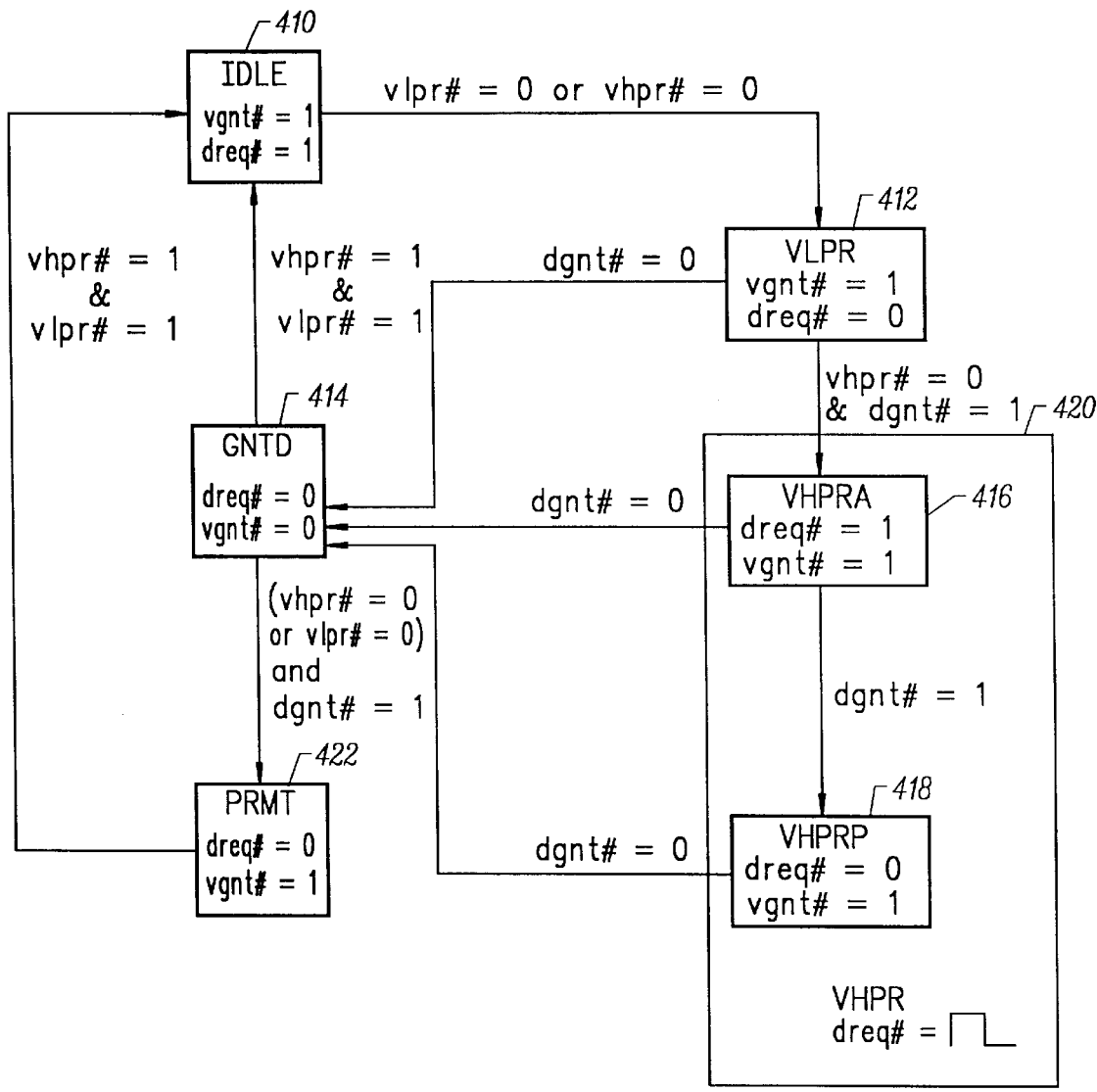

FIG. 4 illustrates the state machine followed by the VC arbitration circuitry 230. The state machine has six states as follows:

| | |
|---|---|
| IDLE | No request pending. |
| VLPR | Internal request has been asserted. |
| VHPRA | High priority request is being asserted. |
| VHPRP | High priority request is pending. |
| GNTD | Resource had been obtained. |
| PRMT | Preemption request from host memory controller received while the video controller had control of the resource. |

When the video controller does not require access to the memory 118, the state machine of FIG. 4 is in the IDLE state 410. In this state, the video controller arbitration circuitry 230 drives dreq# to the HMC arbitration circuitry 216, high.

When the local arbiter 232 asserts a request, either a low priority request using signal vlpr# or a high priority request using signal vhpr#, the state machine transitions to VLPR state 412. In this state, VC arbitration circuitry 230 brings dreq# low to assert a low priority request to the HMC arbitration circuitry 216. VC arbitration circuitry 230 continues to deassert vgnt# to the local arbiter 232, since the video controller 126 has not yet been granted control of the memory.

If the request which caused the state machine to transition to VLPR state 412 was a low priority request (vlpr# asserted and vhpr# deasserted), then the state machine remains in VLPR state 412 until either the VC arbitration circuitry 230 receives dgnt# asserted from the HMC arbitration circuitry 216, or the local arbiter 232 increases the priority level of the request by asserting vhpr# to the VC arbitration circuitry 230. In the former case (dgnt# asserted), the state machine transitions to GNTD state 414 in which the VC arbitration circuitry 230 asserts vgnt# to the local arbiter 232. At this time, the local arbiter 232 asserts either fgnt# to the FIFO 218 or gegnt# to the graphics engine 220, depending on system conditions and the protocol followed by the local arbiter 232 to arbitrate between the FIFO and the graphics engine. The VC arbitration circuitry 230 continues to maintain dreq# low to the HMC arbitration circuitry 216.

If the transition from IDLE state 410 to VLPR state 412 resulted from a high priority request from the local arbiter 232 (vhpr# asserted), and dgnt# remains deasserted from HMC arbitration circuitry 216 in the next clock cycle, then the VC arbitration state machine of FIG. 4 transitions to the VHPRA high priority request asserted state 416. A transition to the VHPRA state 416 will occur also if the initial transition from IDLE state 410 to VLPR state 412 was due to a low priority request (vlpr# asserted) from the local arbiter 232, followed at a later time by assertion of a high priority request from the local arbiter 232 before the video controller has been granted control of the memory 118 (vhpr# asserted and dgnt# deasserted).

In VHPRA state 416, the VC arbitration circuitry 230 continues to deassert vgnt# to the local arbiter 232, but now brings dreq# high to the HMC arbitration circuitry 216. The state machine remains in VHPRA state 416 for only one clock cycle, transitioning to GNTD state 414 if control of the memory has been granted during that clock cycle (dgnt# asserted), or transitioning VHPRP state 418 if not (dgnt# deasserted). In either case, the VC arbitration circuitry brings dreq# low when transitioning out of VHPRA state 416. Thus, regardless of whether the video controller 126 has been granted control of the memory while in VHPRA state 416, the VC arbitration circuitry 230 has effectively issued a one-clock-cycle-wide, high-going pulse on dreq# to the HMC arbitration circuitry 216. The HMC arbitration circuitry 216 recognizes such a pulse as incrementing the priority level of the video controller's request It can be seen that VHPRA state 416 and VHPRP state 418 can be grouped together as two "substates" of a VHPR high priority request state 420; in such state, the VC arbitration circuitry 230 issues a one-clock-cycle-wide, high-going pulse on the dreq# signal to the HMC arbitration circuitry 216.

If the VC arbitration circuitry 230 reaches VHPRP state 418, then it remains in that state until dgnt# is asserted by the HMC arbitration circuitry 216. At that time, the state machine of FIG. 4 transitions to GNTD state 414.

While in GNTD state 414, as previously mentioned, vgnt# is asserted to the local arbiter 232 to allow the appropriate facilities of the video controller 126 to access the memory 118. Also, the VC arbitration circuitry 230 maintains dreq# low to the HMC arbitration circuitry 216. When the video controller 126 no longer requires access to the memory, for example because flwm#, fhwm#, and ger# have all been deasserted to the local arbiter 232, the local arbiter 232 deasserts both vlpr# and vhpr# to the VC arbitration circuitry 230. In response, the state machine of FIG. 4 transitions back to IDLE state 410, in which it deasserts vgnt# to the local arbiter 232 and brings dreq# high to the HMC arbitration circuitry 216. At this time the host memory controller 114 will again take control of the memory 118.

If, on the other hand, the host memory controller 114 requires access to the memory while the VC arbitration circuitry 230 is in GNTD state 414, the host memory controller 114 deasserts dgnt# to the video controller 126. In response to sampling dgnt# deasserted with either vhpr# or vlpr# asserted, the VC arbitration circuitry 230 transitions to PRMT state 412. In this state, the VC arbitration circuitry 230 continues to maintain dreq# low, but at the same time it deasserts vgnt# to the local arbiter 232. The local arbiter 232 determines for itself when the video controller 126 can release the memory 118, based on an algorithm the details of which are unimportant for an understanding of the broader aspects of the invention. It then deasserts both vhpr# and vlpr# to the VC arbitration circuitry 230. In response, the state machine of FIG. 4 transitions to the IDLE state 410 and the memory is released.

C. HMC Arbitration Circuitry State Machine

Figure 5:
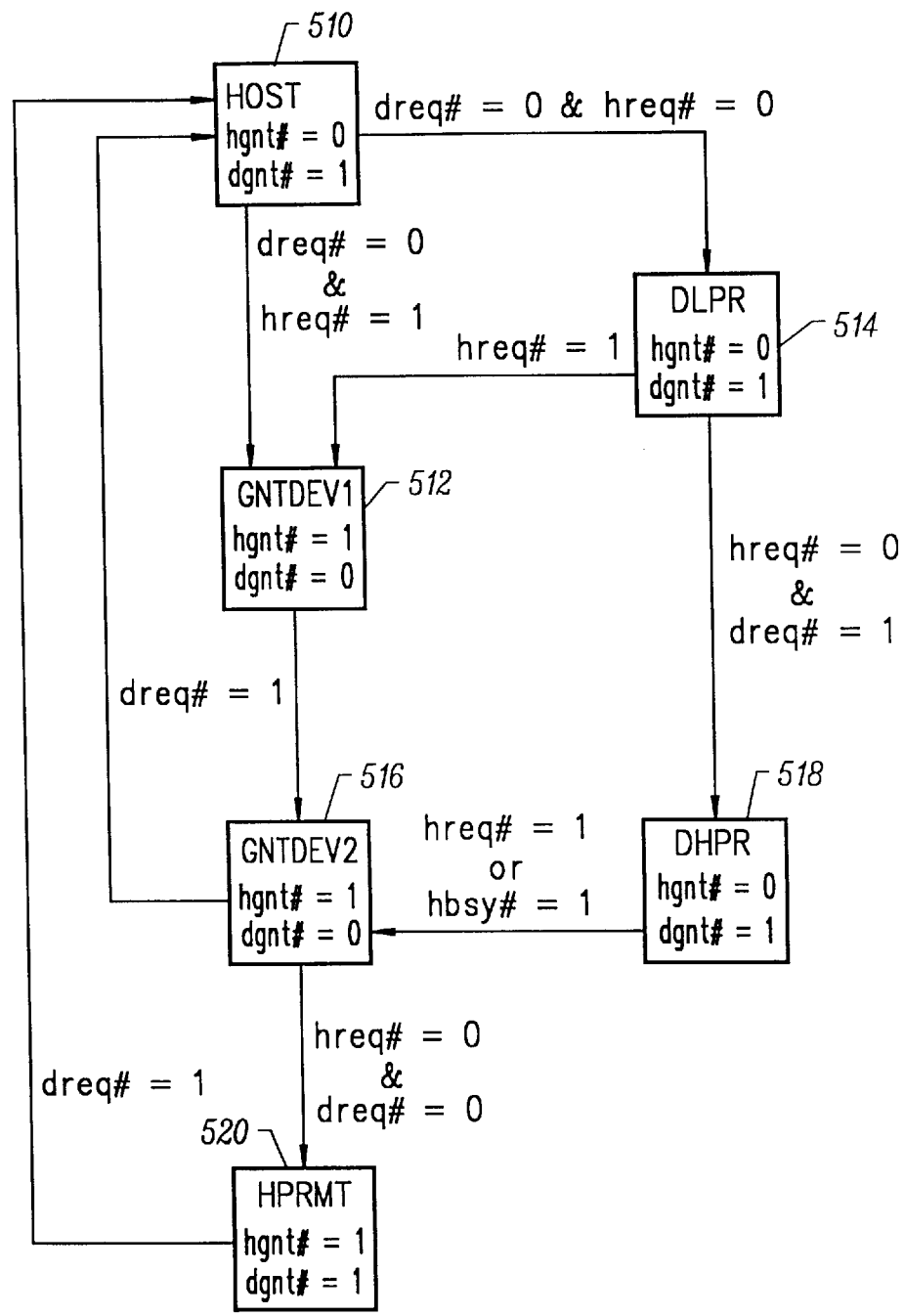

FIG. 5 is a state diagram illustrating an implementation of HMC arbitration circuitry 216 (FIG. 2) for implementing the invention. Of all the possible host states, only the major states pertinent to the invention are illustrated in FIG. 5. It will be appreciated that the states DLPR and DHPR can be implemented in a number of different ways, and therefore the time required by the HMC arbitration circuitry 216 to release the memory 118 may depend on other conditions which are not important in discussing the present invention.

The HMC arbitration circuitry state machine has six primary states as follows:

| | |
|---|---|
| HOST | This is the default state - - the memory is parked with the host memory controller 114. The video controller may drive dreq# low while the HMC arbitration circuitry 216 is in this state. |
| DLPR | The host memory controller 114 has control of the memory or it is in the process of being transferred to the video controller 126 to service a low priority request. |
| DHPR | The host memory controller 114 has control of the memory or it is in the process of being transferred to the video controller 126 to service a high priority request. |
| GNTDEV1 | The video controller has control of the memory. This is an intermediate state to issue an early grant to the video controller in case of a high priority request. |
| GNTDEV2 | The video controller has control of the memory. The HMC arbitration circuitry 216 may deassert dgnt# to signal a preemption request and make a transition to HPRMT state. |
| HPRMT | The video controller has control of the memory, and a preemption request from the HMC arbitration circuitry is pending. |

Referring to the state machine diagram of FIG. 5, the default state is HOST state 510. In this state, the host memory controller 114 has control of the memory 118. HMC arbitration circuitry 216 indicates as much by asserting hgnt# to HMC logic 210, and deasserting dgnt# to the video controller 126.

If HMC arbitration circuitry 216 samples dreq# low from the video controller 126, while hreq# is deasserted, the state machine transitions to GNTDEV1 state 512. It shifts control of the memory 118 from HOST memory controller 114 to video controller 126 by asserting dgnt# and negating hgnt#.

If while in HOST state 510, the HMC arbitration circuitry 216 samples dreq# low with hreq# asserted, then HMC arbitration circuitry 216 transitions to DLPR state 514. As long as dreq# from the video controller 126 remains low, the HMC arbitration circuitry 216 will remain in DLPR state 514 until HMC logic 210 indicates, by negating hreq# to HMC arbitration circuitry 216, that it no longer requires control of the memory. At that time, HMC arbitration circuitry 216 transitions to the GNTDEV1 state 512. On the next clock cycle, HMC arbitration circuitry 216 transitions to GNTDEV2 state 516, retaining dgnt# asserted and hgnt# deasserted.

If, while in DLPR state 514, HMC arbitration circuitry 216 samples dreq# high with hreq# still sampled asserted, then it transitions to DHPR high priority request state 518. As with DLPR state 514, in DHPR state 518, dgnt# remains deasserted, hgnt# remains asserted, and hreq# sampled deasserted will cause a transition to a granted state (in this case, GNTDEV2 state 516). However, in DHPR state 518, the machine will transition to the granted state also if HMC arbitration circuitry 216 samples hbsy# deasserted from HMC logic 210. Thus, HMC arbitration circuitry 216 is likely to shift control of the memory 118 to the video controller 126 earlier from DHPR state 518 than from DLPR state 514.

Both GNTDEV1 state 512 and GNTDEV2 state 516 can be considered substates of a single GNTDEV state, since both substates assert dgnt# and deassert hgnt#. They are represented as separate substates in the embodiment of FIG. 5 because otherwise the state machine can make a false transition to HOST state 510 when the video controller 126 attempts to raise the priority level by bringing dreq# high for the same clock edge that the HMC arbitration circuitry 216 is releasing control of the memory by asserting dgnt#.

While in GNTDEV2 state 516, the video controller 126 can release the memory 118 by bringing dreq# high. In response, the state machine of FIG. 5 transitions back to HOST state 510, shifting control of the memory back to the host memory controller 114. Alternatively, if the host memory controller 114 desires access to the memory, it asserts hreq# to the HMC arbitration circuitry 216. When HMC arbitration circuitry 216 samples hreq# asserted, with dreq# still low, it transitions to HPRMT host preemption state 520. In HPRMT state 520, the HMC arbitration circuitry 216 deasserts dgnt# to the video controller 126, thereby requesting preemption. hgnt# remains deasserted. In response to the preemption request, the video controller 126 will eventually release the memory 118 by bringing dreq# high, in response to which the HMC arbitration circuitry 216 transitions back to HOST state 510.

D. Example Sequences

At this time it would be helpful to illustrate certain example sequences which the state machines traverse under certain assumed conditions.

1. High Priority Request Granted Followed By Preemption

Figure 6:
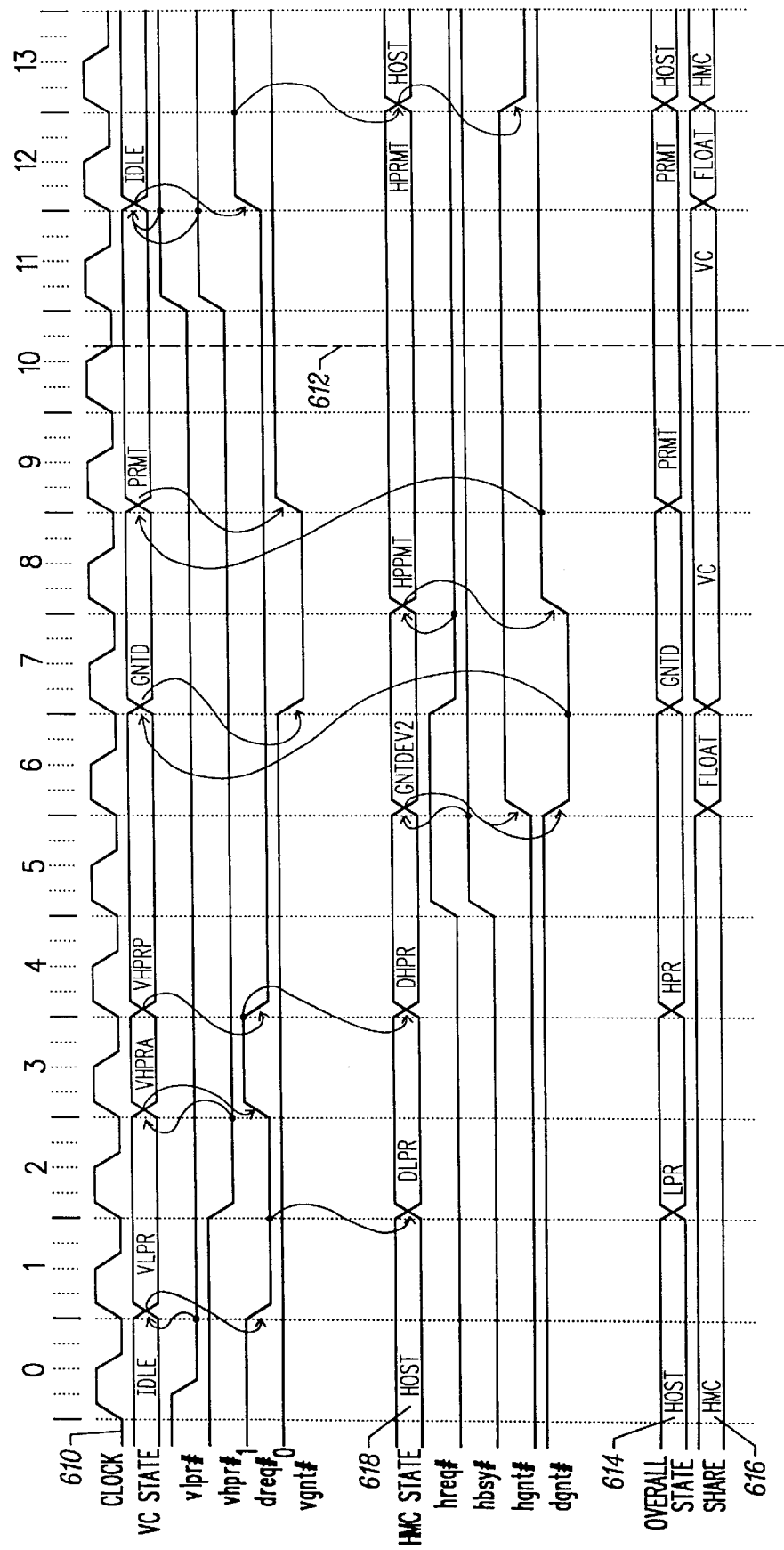
FIGS. 6–8 are timing diagrams illustrating the operation of the arbitration protocol used in FIG. 2.

FIG. 6 is a timing diagram illustrating sequences which occur in the various state machines of the system in one assumed set of conditions. Waveform 610 represents a clock signal which is common to both the host memory controller 114 and the video controller 126. The clock cycles, each of which begin with a rising edge of the clock signal, are numbered consecutively in the timing diagram for convenience of discussion.

Initially, the video controller state machine is in the IDLE state 410, in which dreq# is high and vgnt# to the local arbiter 232 is deasserted (high). The HMC state machine is assumed to begin initially in HOST state 510, and therefore has hgnt# asserted and dgnt# deasserted. It is assumed that the HOST memory controller 114, in response to signals on the HOST bust 112, is actively performing a memory access. Therefore, both hreq# and hbsy# start out asserted.

In clock cycle 0, it is assumed that the local arbiter 232 in the video controller 126 asserts vlpr#, perhaps in response to fhwm# from the FIFO 218. At the beginning of clock cycle 1, the VC arbitration circuit 230 samples vlpr# asserted, and transitions to VLPR state 412. In this state, VC arbitration circuit 230 brings dreq# low to the host memory controller 114. The HMC arbitration circuitry 216 samples dreq# low at the beginning of clock cycle 2, and transitions to its DLPR device low priority request state 514 in response thereto. No outputs of HMC arbitration circuitry 216 change at this time. However, it is also assumed that during clock cycle 2, local arbiter 232 in the video controller asserts a high priority request vhpr# to the VC arbitration circuitry 230, perhaps because the FIFO 218 has now emptied to its low watermark and asserted flwm#. Accordingly, at the beginning of clock cycle 3, VC arbitration circuitry 230 samples vhpr# asserted, and transitions to VHPRA state 416. In this state, VC arbitration circuitry 230 brings its dreq# output high. VC arbitration circuitry 230 then transitions again at the beginning of clock cycle 4 to VHPRP state 418, thereby once again bringing dreq# low.

At the beginning of clock cycle 4, HMC arbitration circuitry 216 samples dreq# high, and transitions to the DHPR device high priority request state 518. There it remains until HMC logic 210 deasserts either hreq# or hbsy#, whichever occurs first.

For the illustration of FIG. 6, it is now assumed that HMC logic 210 deasserts both hbsy# and hreq# in clock cycle 5. (In the present embodiment, HMC logic 210 cannot deassert hreq# without also deasserting hbsy#; thus, it is sufficient for the HMC arbitration circuitry 216 to monitor only hbsy# for this purpose.) The HMC arbitration circuitry 216 samples hbsy# deasserted at the beginning of clock cycle 6, and transitions to its GNTDEV2 state 516 in response thereto. In this state, HMC arbitration circuitry 216 deasserts hgnt# and asserts dgnt# to the video controller 126.

VC arbitration circuitry 230 then samples dgnt# asserted at the beginning of clock cycle 7, and transitions to its GNTD state 414, in which it asserts vgnt# to the local arbiter 232. The video controller 126 can now perform its accesses to the unified memory 118 as required.

In clock cycle 7, it is assumed that the HMC logic 210 once again asserts hreq# to the HMC arbitration circuitry 216. The HMC arbitration circuitry 216 samples hreq# asserted at the beginning of clock cycle 8, and transitions to the HPRMT state 520. In this state, dgnt# is deasserted. The VC arbitration circuitry 230 samples dgnt# deasserted at the beginning of clock cycle 9, and transitions to its PRMT state 422. In this state, the VC arbitration circuitry 230 deasserts vgnt# to the local arbiter 232.

At this time, it is up to the local arbiter 232 to determine when it will release the memory. The time required for it to complete whatever operation it is currently performing is illustrated symbolically in FIG. 6 by wavy line 612. Therefore, in clock cycle 11, it is assumed that local arbiter 232 has decided to release the memory and therefore deasserts both vlpr# and vhpr#. VC arbitration circuitry 230 detects both signals deasserted at the beginning of clock cycle 12, and therefore transitions to IDLE state 410. In this state, dreq# goes high. At the beginning of clock cycle 13, the HMC arbitration circuitry 216 samples dreq# high, and transitions back to its HOST state 510, where it once again asserts hgnt# to the HMC logic 210.

Waveform 614 in FIG. 6 sets forth the overall state of arbitration at all times during the sequence. The indicated states refer to those defined in FIG. 3. Waveform 616 in FIG. 6 indicates which device drives the shared signal lines to the unified memory 118. It can be seen that the HOST memory controller 114 drives the signal lines until the beginning of clock cycle 5, which is one clock cycle before the overall state machine transitions to GNTD state 314. During clock cycle 5, the shared signal lines float, and beginning in clock cycle 6, they are driven by the video controller 126. Again, it can be seen that the video controller continues to drive these signal lines until the beginning of clock cycle 12, which is one clock cycle before the overall arbitration state machine transitions back to HOST state 310. The signal lines float in clock cycle 12, and in clock cycle 13 they are once again driven by the HOST memory 114.

2. Low Priority Request Granted, Followed By Voluntary Relinquishment By Video Controller After returning to the default HOST state 310 in clock cycle 13 of FIG. 6, it is assumed that at some time later, the local arbiter 232 in the video controller 126 again asserts a low priority request vlpr# to the VC arbitration circuitry 230. This is shown in clock cycle 0 of FIG. 7. At the beginning of clock cycle 1, the VC arbitration circuitry 230 samples vlpr# asserted, and transitions to the VLPR state 412 (FIG. 4). In this state, VC arbitration circuitry 230 brings dreq# low. The HMC arbitration circuitry 216 samples dreq# low at the beginning of clock cycle 2, but because hreq# is still asserted, HMC arbitration circuitry 216 transitions to the DLPR device low priority request state 514 (FIG. 5) and does not yet shift control of the memory Unlike the sequence of FIG. 6, the FIG. 7 sequence assumes that the HMC logic 210 deasserts both hreq# and hbsy# in clock cycle 4, before any high priority request is asserted by the video controller 126. At the beginning of clock cycle 5, therefore, the HMC arbitration circuitry 216 samples hreq# deasserted, and transitions to the GNTDEV1 state 512. In this state, HMC arbitration circuitry 216 deasserts hgnt# and asserts dgnt# to the video controller 126. VC arbitration circuitry 230 samples dgnt# asserted at the beginning of clock cycle 6, and transitions to GNTD state 414 in response thereto. In this state, vngt# is asserted to the local arbiter 232. Also at the beginning of clock cycle 6, HMC arbitration circuitry 216 transitions automatically to GNTDEV2 state 516, but no change in output signals results.

Figure 7:
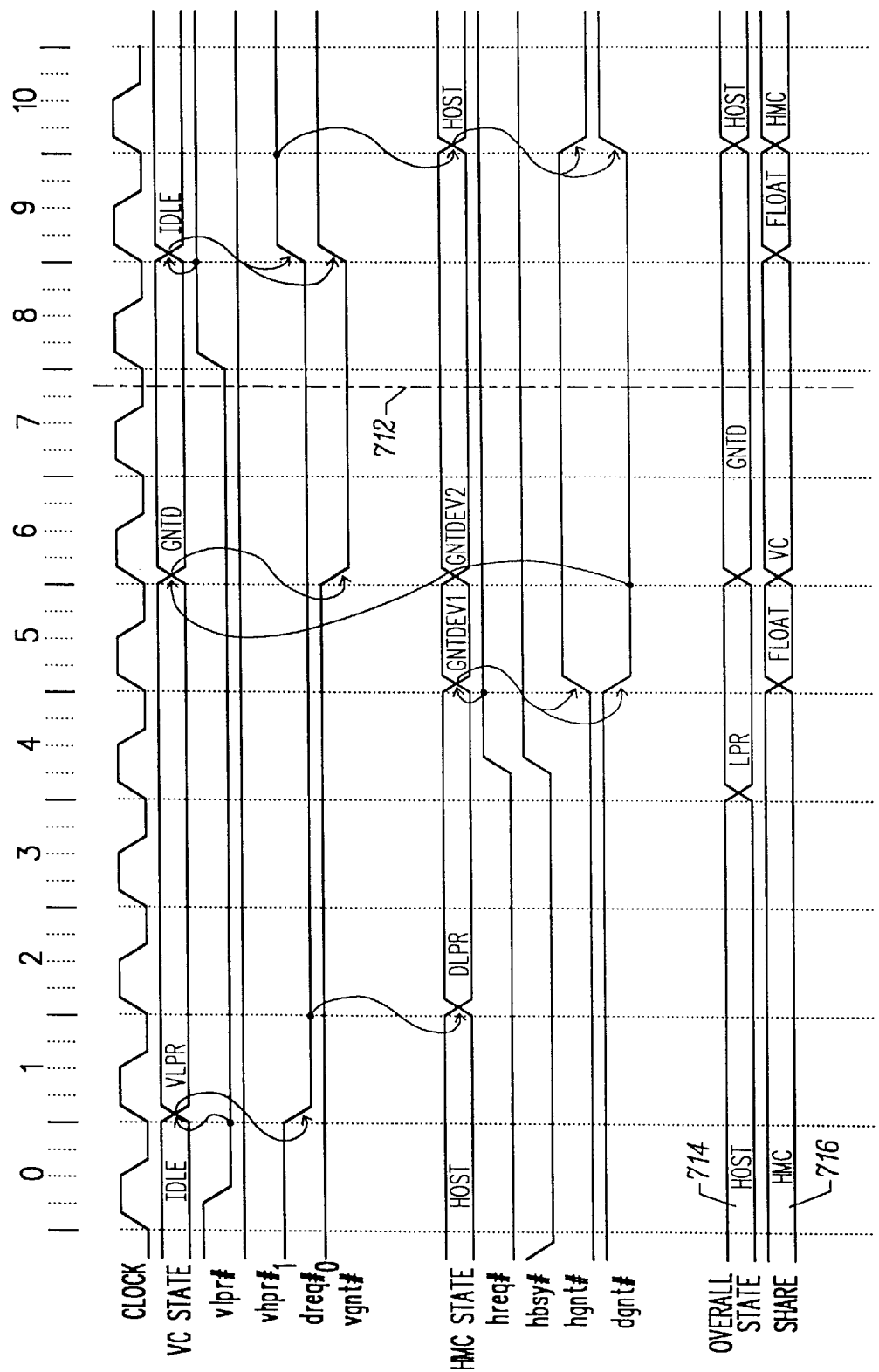

Accordingly, beginning in clock cycle 6 of FIG. 7, the video controller has control of the memory 118 It is assumed in FIG. 7 that the video controller performs its desired memory accesses during the time indicated by wavy line 712, and at the beginning of clock cycle 8, before any preemption request is asserted by host memory controller 114, the local arbiter 232 in video controller 126 deasserts vlpr#. VC arbitration circuitry 230 samples vlpr# deasserted at the beginning of clock cycle 9, and transitions to IDLE state 410. In this state, vgnt# is deasserted to the local arbiter 232 and dreq# is brought high. HMC arbitration circuitry 216 samples dreq# high at the beginning of clock cycle 10, and in response thereto, transitions to HOST state 510. In this state, dgnt# is deasserted to the video controller 126 and control of the memory is "parked" with the host memory controller 114 by once again asserting hgnt# to HMC logic 210.

As with FIG. 6, waveform 714 in FIG. 7 indicates the state of the overall arbiter according to the state machine of FIG. 3 throughout the sequence, and waveform 716 indicates which device drives the shared signal lines at which times to the unified memory 118.

3. Low Priority Request Granted While Memory is Parked with HMC

After the memory has been parked under control of the host memory 114 in clock cycle 10 of FIG. 7, it is assumed that the local arbiter 232 in the video controller 126 asserts a low priority request vlpr# to the VC arbitration circuitry 230 before the host memory controller 114 begins any new access to the memory 118. Accordingly, in FIG. 8, vlpr# is shown being asserted in clock cycle 0. The VC arbitration circuitry 230 samples vlpr# asserted at the beginning of clock cycle 1, and transitions to VLPR state 412. In this state, dreq# is driven low to the host memory controller 114. HMC arbitration circuitry 216 samples dreq# low at the beginning of clock cycle 2, and since hreq# from HMC logic 210 is sampled deasserted at that time, transitions to GNTDEV1 state 512 (and then to GNTDEV2 state 516 at the beginning of clock cycle 3). In GNTDEV1 state 512, the HMC arbitration circuitry 216 deasserts hgnt# to HMC logic 210, and asserts dgnt# to the video controller 126, thereby shifting control of the memory 118 to the video controller 126. At the beginning of clock cycle 3, VC arbitration circuitry 230 samples dgnt# asserted, and transitions to GTND state 414, in which it asserts vgnt# to the local arbiter 232. Video controller 126 then accesses the unified memory 118 as desired.

Figure 8:
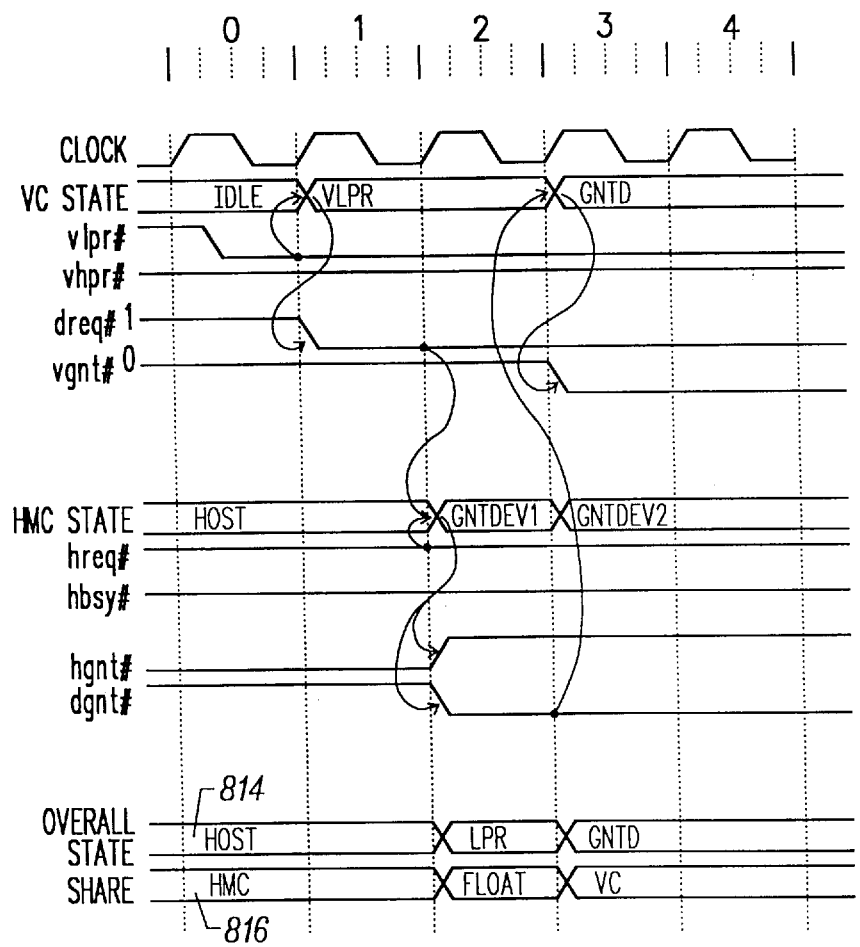

As with FIGS. 6 and 7, waveform 814 in FIG. 8 indicates the state of the overall arbiter according to the state machine of FIG. 3 throughout the sequence, and waveform 816 indicates which device drives the shared signal lines at which times to the unified memory 118.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the embodiments described herein use a high-to-low transition over the device request line dreq# to signal a low priority request, and a subsequent low-to-high transition over the same dreq# line to increase the priority of the request, it will be understood that other embodiments can use other kinds of events on the dreq# line to communicate the same information. Such other events can include edge transitions opposite in polarity to those just described; pulses; predefined and recognizable sequences of edge transitions or pulses; and sequences of edge transitions or pulses occurring with predefined and recognizable timing. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for allocating control of a shared resource by a first device and a second device, comprising the steps of:

granting control of said resource to said first device;

in response to said second device asserting a first access request by bringing an access request signal to a first predetermined logic level at a first time, arbitrating with said first device for control of said resource, said first access request having a first priority level in the arbitration;

in response to said second device bringing said access request signal to a second predetermined logic level at a second time after said first time, if said first access request has not yet been granted, increasing the priority level of said first access request to a second priority level in the arbitration.

2. A method according to claim 1, wherein said first device comprises a host CPU and said second device comprises a video controller, and wherein said shared resource comprises a video frame buffer.

3. A method according to claim 1, wherein said second predetermined logic level is opposite of said first predetermined logic level.

4. A method according to claim 3, wherein said second device, after bringing said access request signal to said first predetermined logic level at the first time, maintains said access request signal at said first predetermined logic level until said first access request has been granted or until said second device brings said access request signal to said second predetermined logic level at said second time, whichever occurs first.

5. A method according to claim 3, wherein the priority level of said second device in the arbitration is increased in response to said second device bringing said access request signal to said second predetermined logic level at said second time, wherein said second device, after bringing said access request signal to said first predetermined logic level at the first time, maintains said access request at said first predetermined logic level until said second device brings said access request to said second predetermined logic level at said second time, and wherein said second device, after bringing said access request signal to said second predetermined logic level at the second time, returns said access request signal to said first predetermined logic level and maintains it at said first predetermined logic level until said first access request has been granted.

6. A method according to claim 1, further comprising the step of granting control of said resource to said second device in accordance with the arbitration.

7. A method according to claim 6, wherein said second device maintains said access request signal at said first predetermined logic level while said second device has control of said resource, further comprising the step of returning control of said resource to said first device in response to said second device bringing said access request signal to a third predetermined logic level being opposite of said first predetermined logic level while said second device has control of said resource.

8. A method according to claim 6, further comprising the step of asserting a preemption signal to said second device in response to an access request from said first device while said second device has control of said resource.

9. A method according to claim 1, further comprising the steps of:

granting control of said resource to said second device in response to negation of a first resource utilization signal from said first device while said first access request has said first priority level or said second priority level in the arbitration; and granting control of said resource to said second device in response to negation of a second resource utilization signal from said first device while said first access request has said second priority level in the arbitration but not while said first access request has said first priority level in the arbitration.

10. A method according to claim 9, wherein said first device performs a series of at least one access to said resource while said first device has control of said resource and said first resource utilization signal is asserted, and wherein said first device deasserts said second resource utilization signal after each of said accesses.

11. A method for allocating control of a memory by a host and an additional device, comprising the steps of:

while said host has control of said memory, transitioning to a device low priority request state in response to a device request signal from said device sampled at a first predetermined logic level with a first host utilization signal sampled asserted;

while in said device low priority request state, transitioning to a device high priority request state in response to said device request signal sampled at a second predetermined logic level with said first host utilization signal sampled asserted; and while in said device high priority request state, shifting control of said memory to said device in response to said first host utilization signal sampled deasserted or a second host utilization signal from said host sampled deasserted, whichever occurs first.

12. A method according to claim 11, wherein said first and second predetermined logic levels are opposite logic levels.

13. A method according to claim 11, further comprising the step of:

while said host has control of said memory, shifting control of said memory to said device in response to said device request signal sampled at said first logic level with said first host utilization signal sampled deasserted.

14. A method according to claim 11, further comprising the steps of:

while said host bus has control of said memory, transitioning to said device low priority request state a second time in response to said device request signal sampled at said first logic level with said first host utilization signal sampled asserted; and while in said device low priority request state the second time, shifting control of said memory to said device in response to said first host utilization signal sampled deasserted.

15. A method according to claim 11, further comprising the step of, while said device has control of said memory, shifting control of said memory to said host in response to said device request signal sampled at a third predetermined logic level.

16. A method according to claim 15, wherein said first and second predetermined logic levels are opposite logic levels, and wherein said third predetermined logic level is the same as said first predetermined logic level.

17. A method according to claim 11, further comprising the steps of:

while said device has control of said memory, transitioning to a host preemption state in response to said first host utilization signal sampled asserted with said device request signal sampled at a fourth predetermined logic level; and while in said host preemption state, shifting control of said memory to said host in response to said device request signal sampled at a fifth predetermined logic level.

18. A method according to claim 17, wherein said first and second predetermined logic levels are opposite logic levels, and wherein said fourth logic level is the same as said first logic level and said fifth logic level is the same as said second logic level.

19. A method for arbitrating for control of a shared resource on behalf of a device, comprising the steps of:

while in an idle state, transitioning to a low priority request state in response to a high priority request signal from said device sampled asserted;

maintaining a device request signal to an arbiter at a first predetermined logic level while in said low priority request state;

while in said low priority request state, transitioning to a high priority request state in response to said high priority request signal sampled asserted with a device grant signal from said arbiter sampled deasserted;

bringing said device request signal to a second predetermined logic level for at least one clock cycle while in said high priority request state; and while in said high priority request state, taking control of said resource in response to said device grant signal sampled asserted.

20. A method according to claim 19, wherein said first and second logic levels are opposite logic levels.

21. A method according to claim 19, wherein said step of transitioning to a high priority request state comprises a step of transitioning to a high priority request assertion substate of said high priority request state, and wherein said step of bringing said device request signal to a second predetermined logic level for at least one clock cycle comprises the steps of:

maintaining said device request signal at said second predetermined logic level while in said high priority request assertion substate;

while in said high priority request assertion substate, transitioning to a high priority request pending substate in response to said device grant signal sampled deasserted; and maintaining said device request signal at said first predetermined logic level while in said high priority request pending substate.

22. A method according to claim 19, further comprising the steps of:

while in said idle state, transitioning to said low priority request state a second time in response to said high priority request signal sampled asserted; and while in said low priority request state, taking control of said resource in response to said device grant signal sampled asserted.

23. A method for arbitrating for control of a shared resource on behalf of a device, comprising the steps of:

while in an idle state, transitioning to a low priority request state in response to a low priority request signal from said device sampled asserted;

maintaining a device request signal to an arbiter at a first predetermined logic level while in said low priority request state;

while in said low priority request state, transitioning to a high priority request state in response to a high priority request signal from said device sampled asserted with a device grant signal from said arbiter sampled deasserted;

bringing said device request signal to a second predetermined logic level for at least one clock cycle while in said high priority request state;

while in said high priority request state, taking control of said resource in response to said device grant signal sampled asserted; and while in said idle state, transitioning to said low priority request state a second time in response to a high priority request signal from said device sampled asserted.

24. A method according to claim 23, wherein said first and second logic levels are opposite logic levels.

25. A method according to claim 23, further comprising the steps of:

while in said idle state, transitioning to said low priority request state a second time in response to said low priority request signal sampled asserted; and while in said low priority request state, taking control of said resource in response to said device grant signal sampled asserted.

26. A method according to claim 23, further comprising the step of:

while in control of said resource, releasing said resource and transitioning to said idle state in response to said low priority request signal and said high priority request signal both sampled deasserted.

27. A method according to claim 26, further comprising the step of maintaining said device request signal at a third predetermined logic level while in control of said resource, and wherein said step of releasing said resource comprises the step of bringing said device request signal to a fourth predetermined logic level, opposite of said third predetermined logic level.

28. A method according to claim 27, wherein said first predetermined logic level is the same as said third predetermined logic level and said second predetermined logic level is the same as said fourth predetermined logic level.

29. A method according to claim 23, further comprising the steps of:

while in control of said resource, transitioning to a preemption state in response to said device grant signal sampled deasserted with at least one of said low and high priority request signals sampled asserted;

asserting a preemption request to said device while in said preemption state; and while in said preemption state, releasing said resource and transitioning to said idle state in response to said low priority request signal and said high priority request signal both sampled deasserted.

30. A method according to claim 23, wherein said shared resource comprises a memory and said device comprises a video controller, said video controller having a FIFO buffer for buffering frame buffer data to be transmitted to a display, wherein said video controller asserts said low priority request signal whenever at least a predetermined number p entries in said FIFO are empty, and asserts said high priority request signal whenever at least a predetermined number q entries in said FIFO are empty, q>p.

31. Arbitration apparatus for use with a shared resource, a first device and an additional device, comprising a central arbiter having a first request input line coupled to said additional device, said central arbiter having circuitry which:

in response to a first predefined event received by said central arbiter via said first request input line, arbitrates among said devices in a first arbitration for control of said resource with said additional device at a first priority level relative to said first device; and which in response to a second predefined event received by said central arbiter via said same first request input line after receipt by said central arbiter of said first predefined event, terminates said arbitration and arbitrates among said devices in a second arbitration for control of said resource with said additional device at a second priority level relative to said first device, said first and second priority levels being different.

32. Apparatus according to claim 31, for use further with a further device, wherein said central arbiter further has a second request input line coupled to said further device, and wherein said circuitry arbitrates among said first device, said additional device and said further device in each of said first and second arbitrations.

33. Apparatus according to claim 31, wherein said first predefined event received by said central arbiter via said first request input line comprises a signal on said first request input line being sampled by said circuitry at a first predefined logic level.

34. Apparatus according to claim 33, wherein said second predefined event received by said central arbiter via said first request input line comprises said signal on said first request input line being sampled by said circuitry at a second predefined logic level being opposite of said first predefined logic level.

35. Apparatus according to claim 34, wherein, after receiving said second predefined event, said circuitry ignores all subsequent logic level transitions in said signal on said first request input line until said additional device is granted control of said resource in said second arbitration.

36. Apparatus according to claim 31, wherein said second priority level is higher than said first priority level.

37. Apparatus according to claim 31, wherein in said first arbitration said central arbiter shifts control of said resource from said first device to said additional device in response to a first predefined resource utilization condition of said first device, and wherein in said second arbitration said central arbiter shifts control of said resource from said first device to said additional device in response to the earliest to occur of said first predefined resource utilization condition and a second predefined resource utilization condition.

38. Apparatus according to claim 37, wherein said first predefined resource utilization condition comprises negation by said first device of a first utilization signal coupled to said central arbiter, and wherein said second predefined resource utilization condition comprises negation by said first device of a second utilization signal coupled to said central arbiter.

39. Apparatus according to claim 37, wherein said shared resource comprises a memory,
wherein said first device asserts a first utilization signal to said central arbiter when said first device is accessing said memory and also when said first device desires access to said memory,
wherein said first device asserts a second utilization signal to said central arbiter while said first device is accessing said memory, said first device negating said second utilization signal in conjunction with completion of each access of said memory by said first device,
wherein said first predefined resource utilization condition comprises negation by said first device of said first utilization signal,
and wherein said second predefined resource utilization condition comprises negation by said first device of said second utilization signal.

40. Apparatus according to claim 31, wherein said central arbiter further has a first grant output line coupled to said additional device, and further has circuitry which, after one of said first and second arbitrations, grants control of said resource to said additional device by asserting a predefined grant signal on said first grant output line.

41. Apparatus according to claim 40, wherein said central arbiter further includes circuitry which, while said additional device has control of said resource, deasserts said predefined grant signal on said first grant output line in response to a preemption request from said first device.

42. Arbitration apparatus for use with a shared resource, a host device and an additional device, said host device requiring control of said resource with at least low and high levels of necessity at different times, said arbitration apparatus comprising a central arbiter having a device request signal line and a device grant signal line both coupled to said additional device, said central arbiter further comprising circuitry which:

asserts a device grant signal on said device grant signal line in response to said central arbiter detecting said device request signal line at a first predetermined logic level while said host device does not require control of said resource;

if said host device does require control of said resource when said central arbiter first detects said device request signal line at said first predetermined logic level, asserts said device grant signal in response to said host device no longer requiring control of said resource;

if said host device does require control of said resource when said central arbiter first detects said device request signal line at said first predetermined logic level, asserts said device grant signal in response to said central arbiter thereafter first detecting said same device request signal line at a second predetermined logic level while said host device's requirement for control of said resource has said low level of necessity; and if said host device does require control of said resource when said central arbiter first detects said device request signal line at said first predetermined logic level, and further requires said resource with said high level of necessity when said central arbiter thereafter first detects said same device request signal line at said second predetermined logic level, asserts said device grant signal in response to said host no longer requiring said resource with said high level of necessity.

43. Apparatus according to claim 42, wherein said central arbiter further has first and second request inputs both received from said host,
wherein said central arbiter determines by sampling both said first and second inputs deasserted, that said host device does not require control of said resource,
wherein said central arbiter determines by sampling said first input asserted and said second input deasserted, that said host device requires control of said resource with said low level of necessity;
and wherein said central arbiter determines by sampling at least said second input asserted, that said host device requires control of said resource with said high level of necessity.

44. Apparatus according to claim 42, wherein said second predefined logic level is opposite of said first predefined logic level.

45. Arbitration apparatus for use with a requesting device, a shared resource and a central arbiter, comprising a device request output signal line coupled to said central arbiter, and further comprising device arbitration circuitry which:
in response to a low priority request received by said device arbitration circuitry from said requesting device, asserts a first predefined event on said device request output signal line to said central arbiter; and which
in response to a high priority request received by said device arbitration circuitry from said requesting device, asserts a second predefined event on said same device request output signal line, said second predefined event being distinguishable from said first predefined event, and neither of said first and second predefined events being qualified by any other signal output by said device arbitration circuitry.

46. Apparatus according to claim 45, wherein said device arbitration circuitry asserts said second predefined event only after asserting said first predefined event.

47. Apparatus according to claim 45, wherein said first predefined event comprises bringing a signal on said device request output signal line to a first predefined logic level.

48. Apparatus according to claim 47, wherein said second predefined event comprises bringing said signal on said device request output signal line to a second predefined logic level opposite of said first predefined logic level, after having brought said signal on said device request output signal line to said first predefined logic level to assert said first predefined event.

49. Apparatus according to claim 45, wherein said shared resource comprises a shared memory and said requesting device comprises a FIFO memory buffering data from said shared memory to a video output, and wherein said device arbitration circuitry further comprises local circuitry which:
  asserts said low priority request to said device arbitration circuitry in response to said FIFO memory emptying below a predefined high water mark; and which
  asserts said high priority request to said device arbitration circuitry in response to said FIFO memory emptying below a predefined low water mark.

50. Apparatus according to claim 49, wherein said requesting device further comprises a graphics engine, and wherein said local circuitry asserts said low priority request to said device arbitration circuitry also in response to a request from said graphics engine for control of said resource.

51. Arbitration apparatus for use with a shared memory, a FIFO memory buffering data to a video output, and a central arbiter, comprising a device request output signal line coupled to said central arbiter, and further comprising device arbitration circuitry which:
  in response to said FIFO memory emptying below a predefined high water mark, asserts a first predefined state on said device request output signal line to said central arbiter; and which
  in response to said FIFO memory emptying below a predefined low water mark, asserts a second predefined state on said same device request output signal line to said central arbiter,
  wherein said device arbitration circuitry maintains said first predefined state on said device request output signal line once asserted, at least until the earlier to occur of (a) said FIFO memory empties below said predefined low water mark, and (b) said device arbitration circuitry receives an indication granting access to said shared memory.

52. Apparatus according to claim 51, for use further with a host device, and further comprising said central arbiter, said host device requiring control of said memory with low and high levels of necessity at different times, said central arbiter having a device grant output signal line coupled to said device arbitration circuitry and further having circuitry which:
  asserts a device grant signal on said device grant signal line in response to detection of said first predefined state by said central arbiter while said host device does not require control of said shared memory;
  if said host device does require control of said shared memory when said central arbiter detects said first predefined state, asserts said device grant signal in response to said host device no longer requiring control of said shared memory;
  if said host device does require control of said shared memory when said central arbiter detects said first predefined state, asserts said device grant signal in response to said second predefined state being detected by said central arbiter while said host device's requirement for control of said shared memory has said low level of necessity; and
  if said host device requires said shared memory with said high level of necessity when said central arbiter detects said second predefined state, asserts said device grant signal in response to said host no longer requiring said shared memory with said high level of necessity.

53. Apparatus according to claim 51, wherein said first predefined state comprises a second predefined logic level on said device request output signal line.

54. Apparatus according to claim 53, wherein said second predefined state comprises a second predefined logic level on said device request output signal line, said second predefined logic level being opposite of said first predefined logic level.

55. Apparatus according to claim 54, for use further with a host device, and further comprising said central arbiter, said host device requiring control of said memory with low and high levels of necessity at different times, said central arbiter having a device grant output signal line coupled to said device arbitration circuitry and further having circuitry which:
  asserts a device grant signal on said device grant signal line in response to said central arbiter detecting said first predefined state while said host device does not require control of said shared memory;
  if said host device does require control of said shared memory when said central arbiter detects said first predefined state, asserts said device grant signal in response to said host device no longer requiring control of said shared memory;
  if said host device does require control of said shared memory when said central arbiter detects said first predefined state, asserts said device grant signal in response to said central arbiter detecting said second predefined state while said host device's requirement for control of said shared memory has said low level of necessity; and
  if said host device requires said shared memory with said high level of necessity when said central arbiter detects said second predefined state, asserts said device grant signal in response to said host no longer requiring said shared memory with said high level of necessity.

56. An arbiter for arbitrating control of a shared resource by a plurality of devices including a subject device, said arbiter performing an arbitration with said subject device at a first priority level in response to a first type of request received from said subject device, and performing an arbitration with said subject device at a second priority level different from said first priority level in response to a second type of request received from said subject device, said arbiter comprising:
  arbitration circuitry;
  at least one respective device grant signal line output from said arbitration circuitry for each of said devices;
  at least one respective device request signal line input to said arbitration circuitry for each of said devices other than said subject device; and
  exactly one device request signal line input to said arbitration circuitry for said subject device.

57. An arbiter according to claim 56, wherein said shared resource is a memory, said subject device comprises a video controller, and an additional one of said devices comprises a host processor.

58. An arbiter according to claim 56, wherein said arbiter comprises exactly one respective device grant signal line output from said arbitration circuitry for each of said devices; and exactly one respective device request signal line input to said arbitration circuitry for each of said devices.

59. An arbiter according to claim 56, wherein said arbitration circuitry includes determining circuitry which detects a request of said first type received from said subject device by detecting a first predefined event received by said arbitration circuitry on said exactly one device request signal line, and detects a request of said second type received from said subject device by detecting a second predefined event received by said arbitration circuitry on said exactly one device request signal line, said second predefined event being distinguishable by said determining circuitry from said first predefined event.

60. A device arbitration circuit for arbitrating at selectably a first or a second priority level on behalf of a subject device for control of a resource shared by a plurality of devices including said subject device, said device arbitration circuit having at least one device grant signal line input and exactly one device request line output.

61. A circuit according to claim 60, wherein said shared resource is a memory, said subject device comprises a video controller, and an additional one of said devices comprises a host processor.

62. A circuit according to claim 60, wherein said device arbitration circuit has exactly one device grant signal line input.

63. An arbiter according to claim 60, wherein said arbitration circuitry includes circuitry which, in order to arbitrate at said first priority level on behalf of said subject device, drives a first predefined event onto said exactly one device request line output, and in order to arbitrate at said second priority level on behalf of said subject device, drives a second predefined event onto said exactly one device request line output, said second predefined event being distinguishable from said first predefined event.

64. Apparatus for arbitrating control of a shared resource by a plurality of devices including a subject device, comprising:

a device arbitration circuit for arbitrating at selectably a first or a second priority level on behalf of said subject device for control of said shared resource;

a central arbitration circuit arbitrating control of said shared resource;

at least one respective device grant signal line coupled from said central arbitration circuit to each of said devices;

at least one respective device request signal line coupled from each of said devices other than said subject device, to said central arbitration circuit; and exactly one device request signal coupled from said subject device to said central arbitration circuit.

65. Apparatus according to claim 64, comprising exactly one respective device grant signal line coupled from said central arbitration circuit to each of said devices; and exactly one respective device request signal line coupled from each of said devices to said central arbitration circuit.

66. An arbiter according to claim 64, wherein said device arbitration circuit includes circuitry which, in order to arbitrate at said first priority level on behalf of said subject device, drives a first predefined event onto said exactly one device request line output, and in order to arbitrate at said second priority level on behalf of said subject device, drives a second predefined event onto said exactly one device request line output, said second predefined event being distinguishable from said first predefined event, and wherein said central arbitration circuit performs an arbitration with said subject device at said first priority level in response to receipt by said central arbitration circuit of said first predefined event on said exactly one device request signal line, and performs an arbitration with said subject device at said second priority level in response to receipt by said central arbitration circuit of said second predefined event on said exactly one device request signal line.

67. An arbiter according to claim 56, wherein said arbitration circuitry is formed on at least one integrated circuit chip, and wherein said exactly one device request signal line input crosses a boundary of said at least one integrated circuit chip.

68. A circuit according to claim 60, wherein said arbitration circuit is formed on at least one integrated circuit chip, and wherein said exactly one device request line output crosses a boundary of said at least one integrated circuit chip.

69. Apparatus according to claim 64, wherein said exactly one device request signal line crosses at least one integrated circuit chip boundary.

* * * * *